US012485938B2

(12) United States Patent
Nowotny et al.

(10) Patent No.: US 12,485,938 B2
(45) Date of Patent: Dec. 2, 2025

(54) DISTRIBUTED AND OPEN DATABASE FOR THE DYNAMIC CAPTURE OF THE RAILWAY LINE NETWORK AND ELEMENTS ASSOCIATED THEREWITH

(71) Applicant: TRACK MACHINES CONNECTED GESELLSCHAFT M.B.H., Linz (AT)

(72) Inventors: Jochen Nowotny, Gaaden bei Mödling (AT); Dominic Winkler, Gerasdorf bei Wien (AT); Karl Kernstock, Linz (AT); Benjamin Stuntner, Linz (AT)

(73) Assignee: TRACK MACHINES CONNECTED GESELLSCHAFT M.B.H., Linz (AT)

( * ) Notice: Subject to any disclaimer, the term of this patent is extended or adjusted under 35 U.S.C. 154(b) by 428 days.

(21) Appl. No.: 18/015,973

(22) PCT Filed: Jul. 14, 2021

(86) PCT No.: PCT/AT2021/060249
§ 371 (c)(1),
(2) Date: Jan. 13, 2023

(87) PCT Pub. No.: WO2022/011408
PCT Pub. Date: Jan. 20, 2022

(65) Prior Publication Data
US 2023/0286559 A1    Sep. 14, 2023

(30) Foreign Application Priority Data

Jul. 15, 2020  (AT) .............. A 50612/2020

(51) Int. Cl.
*B61L 25/04*  (2006.01)
*B61L 27/10*  (2022.01)
(52) U.S. Cl.
CPC .............. *B61L 25/04* (2013.01); *B61L 27/10* (2022.01)

(58) Field of Classification Search
None
See application file for complete search history.

(56) References Cited

U.S. PATENT DOCUMENTS 9,810,533 B2 * 11/2017 Fosburgh .............. B61L 23/041
10,019,761 B2 * 7/2018 Cuttell .................. G06Q 40/08
(Continued)

FOREIGN PATENT DOCUMENTS

EP    3138754 A1    3/2017

OTHER PUBLICATIONS

Corongiu et al., "Data Integration of Different Domains in Geo-Information Management: A Railway Infrastructure Case Study", The International Archives of the Photogrammetry, Remote Sensing and Spatial Information Sciences, vol. 42, No. 4, Oct. 1, 2018, pp. 121-127.

(Continued)

*Primary Examiner* — Jonathan M Dager
(74) *Attorney, Agent, or Firm* — Liang & Hennessey LLP; Brian Hennessey

(57) ABSTRACT

Method for creating a database for recording a railway line including objects, wherein first measurement values and second measurement values, which measurement values include measurement value attributes created by means of a sensor and/or by an input and which measurement values are created using an absolute coordinate reference system and/or relative first coordinate reference system, which measurement values describe a condition of the railway line or a vehicle traveling on the railway line, by performing coordinate transformation of the optionally relative coordinate reference system and the optionally absolute coordinate reference system into a unified coordinate reference system and by generating a unified measurement value set comprising the first measurement values and/or the second measure- (Continued)

ment values, are stored in the database, wherein, in generating the measurement value set, the measurement value attributes of the measurement values are stored in a database in a defined structure in the unified measurement value set.

17 Claims, 4 Drawing Sheets

(56) References Cited

U.S. PATENT DOCUMENTS

| | | | |
|---|---|---|---|
| 10,322,734 B2* | 6/2019 | Mesher | B61L 23/045 |
| 10,589,763 B2* | 3/2020 | Buerger | G01C 11/06 |
| 10,870,441 B2* | 12/2020 | Mesher | B61L 23/00 |
| 11,169,269 B2* | 11/2021 | Mesher | B61L 15/0054 |
| 11,196,981 B2* | 12/2021 | Mesher | H04N 13/243 |
| 11,377,130 B2* | 7/2022 | Mesher | B61L 99/002 |
| 11,429,758 B1* | 8/2022 | Schaffer | B61L 27/53 |
| 11,834,082 B2* | 12/2023 | Miller | B61L 15/0072 |
| 11,861,819 B2* | 1/2024 | Krueger | G06T 7/0004 |
| 12,033,312 B2* | 7/2024 | Kohler | G06N 20/00 |
| 2004/0263624 A1* | 12/2004 | Nejikovsky | B61L 23/042 348/148 |
| 2005/0192720 A1* | 9/2005 | Christie | B61L 27/14 701/19 |
| 2007/0150130 A1* | 6/2007 | Welles | B61L 25/025 701/19 |
| 2010/0026551 A1* | 2/2010 | Szwilski | B61K 9/08 342/357.34 |
| 2012/0192756 A1* | 8/2012 | Miller | B61L 23/048 701/19 |
| 2014/0142868 A1* | 5/2014 | Bidaud | G01N 21/8803 702/34 |
| 2017/0106885 A1* | 4/2017 | Singh | B61L 23/045 |
| 2018/0339720 A1* | 11/2018 | Singh | G06T 7/001 |
| 2019/0136462 A1* | 5/2019 | Buerger | E01B 35/12 |
| 2020/0302592 A1* | 9/2020 | Ebersohn | G06T 11/60 |
| 2021/0094595 A1* | 4/2021 | Kälberer | B61L 25/025 |
| 2021/0174410 A1* | 6/2021 | Anderson | G06Q 50/26 |
| 2022/0169295 A1* | 6/2022 | Chen | B61L 27/40 |
| 2023/0415800 A1* | 12/2023 | Ono | B61L 23/041 |
| 2025/0022159 A1* | 1/2025 | Laviron | G01S 17/89 |
| 2025/0100598 A1* | 3/2025 | Jamshidi | B61L 23/045 |
| 2025/0100601 A1* | 3/2025 | Marin | G06T 7/246 |

OTHER PUBLICATIONS

International Search Report and Written Opinion in International Application No. PCT/AT2021/060249, mailed Nov. 12, 2021, 20 pages.

* cited by examiner

Key: WA = begin of switch; WM = middle of switch;
WE = end of switch; 1:n = inclination of switch

DISTRIBUTED AND OPEN DATABASE FOR THE DYNAMIC CAPTURE OF THE RAILWAY LINE NETWORK AND ELEMENTS ASSOCIATED THEREWITH

CROSS-REFERENCE TO RELATED APPLICATIONS

The present application is a national phase application of PCT Application No. PCT/AT2021/060249, filed Jul. 14, 2021, entitled "DISTRIBUTED AND OPEN DATABASE FOR THE DYNAMIC CAPTURE OF THE RAILWAY LINE NETWORK AND ELEMENTS ASSOCIATED THEREWITH", which claims the benefit of Austrian Patent Application No. A50612/2020, filed Jul. 15, 2020, each of which is incorporated by reference in its entirety.

BACKGROUND OF THE INVENTION

1. Field of the Invention

The invention relates to a method of creating a database, by means of which database a railway network can be recorded by means of measurement values and the same measurement values can be administered as data.

2. Description of the Related Art

In the prior art, the condition of a railway line can be determined by creating measurement values.

A railway network is characterized by an area of a railway line being connected to the railway network via at least one nodal point. A railway line can be connected to the railway network via two nodal points, as illustrated below based on a figure.

For example, measurement values describing the rail geometry and/or the line geometry of a railway line, the structure of a railroad of a railway line and the surroundings of the railway line can be determined with the help of sensors, including but not limited to a rotation scanner, but also photosensors for creating pictures. Furthermore, it is known to control rail-bound vehicles or other devices on the basis of such measurement values.

A rotation laser scanner represents a practical embodiment of a rotation scanner. The type of such measurement values and the significance of the measuring method associated with creating the measurement values is highly dependent on the measuring sensors employed and/or the measuring methods applied. The skilled person will already identify an initial problem underlying this invention, i.e., lack of comparability and limited ways of correlating measurement values or measurement results from the measuring methods of prior art.

Furthermore, it is common to record the condition of a railway line by a subjective description. A subjective description can be produced additional or alternative to measurement values determined by means of sensors. A subjective description of a partial area of a railway line can, for example, comprise a picture recorded by a person of skill in the art and/or a description as well as an indication of the location of the railway line.

There are currently about one hundred providers in the railroad industry, who work with about fifty different measurement requirements. A measurement requirement herein is understood to mean a unique, stand-alone requirement of a provider independent of a measurement means. If a measurement means is able to meet three measurement requirements, it may be assumed that there are about three hundred measurement means among the about one hundred providers.

To sum up, the known measurement means can be used to determine a large number of measurement values meeting the individual measurement requirements, which measurement values, however, can be compared or correlated with one another to only a very limited extent due to the abundance of providers, measurement means, measuring methods et cetera, since the individual measurement values for meeting the criteria described above are different in character. While on the hand, a large amount of data may be present, said amount of data cannot by analyzed.

SUMMARY OF THE INVENTION

In the context of the disclosure of this invention, the term analyzing data is understood to mean that the data can be at least compared or correlated with one another of processed using a method according to current teachings such as artificial intelligence and/or model comparison. Analyzing railway-specific data is possible to only a very limited extent by methods of prior art.

Superordinate to the problem laid out above in connection with determining the measurement values, there are different methods for administrating such measurement values. Since the railroad industry has a highly nationalized structure and each railway company is presumed to have its own methods of administrating the measured data, the problem of determining the measurement values is exacerbated by the different methods of administration. The different national methods and regulations for determining data on a national railway network or line is surely a key problem to be solved in terms of comprehensive data administration.

All attempts to standardize measurement value administration in databases have so far failed due to the nationalized structure of the railway basis.

Also, in the context of discussing the problem underlying this invention, one should bear in mind that railway lines extend in natural surroundings. As a consequence, any determination of measurement values is subject to natural influences independent of national regulations on performing measuring methods, which natural influences are not completely ascertainable. Natural influences can often be established only by comparing measurement values or the data generated from such measurement values. This analysis of data necessary for making sense of natural influences is not possible according to current teachings.

However, it is extremely important in the appropriate administration of railway lines or railway networks for data to be sufficiently analyzable. Data analysis allows efficient maintenance and/or servicing of a railway line and, by extension, a railway network.

An abundance of measured data on a railway line on the one hand and a lack of analyzability of such data on the other hand make for a highly unsatisfying status quo. Data analysis can basically be performed by comparing and/or correlating subsets of data.

In the context of the invention, a measurement value is a value which describes a condition of the railway line or a surrounding of such railway line. A measurement value can also describe a condition which has direct influence on the railway line or, via the surrounding of the railway line, indirect influence on the railway line.

A measurement value can comprise, for example, a measure or other physical, measurable dimension as a measurement attribute and a location as a measurement location attribute and a temporal attribute describing the time of determination. A measurement value can also comprise an indication of which object or objects, such as rails, ballast, vegetation, groundwater etc., the measurement value concerns. In general, it can be assumed that the number of such measurement values and the number of conditions which are described by the measurement values will increase in the future.

A measurement value can also describe a condition of a vehicle present or moved on a railway line. A such measurement value can describe, for example and therefore not limited to, the operation, direction of travel or function of the vehicle.

Operation of the vehicle can be recorded, for example and therefore not limited to, by the vehicle's energy consumption or by the movement of an element of the vehicle. A such measurement value can describe the movement of the vehicle or the necessary processes by which the vehicle is set, or kept, in operation.

A measurement value describing the function of the vehicle is closely associated with a measurement value describing the operation of the vehicle; a strict distinction is often not expedient for a person of skill in the art. A measurement value describing the function of the vehicle can describe the function for which the vehicle is present on the railway line, such as, for example, transporting individuals (herein, for example: number of individuals transported) or repairing the rail (herein, for example: plugging).

The measurement values describing the operation and function can comprise description of the vehicle's attrition.

The direction of travel can be determined via a change in position by applying methods of prior art. Examples of measurement values are given in disclosure below. The examples of measurement values are by no means to be classified as limiting. In general, a measurement value can be a value via which a condition with physical units is recorded directly as a measurement dimension or indirectly, such as, for example, via an image or a subjective description.

A measurement value can be created by means of a measurement sensor. A measurement sensor can measure, for example, a distance, optionally depending on time or localization. A measurement sensor can, for example, be an image sensor etc.

A measurement value can be created by user input. The user input does not need to be limited to indicating a physical dimension as a possible form of objective description; the input can also be a subjective description, which subjective description is given, for example, by a person of skill in the art during inspections of a line or rail. The description can concern the railway line or a surrounding of the railway line.

A measurement value and the measurement location can be localized in a railway network. In prior art, different methods of localizing the measurement location can be executed, such as, for example, localization by means of a coordinate system. Localization can be, for example, via an absolute coordinate system or a relative coordinate system.

Measurement values (in the following referred to as first measurement values and second measurement values) can be created by different measuring systems (in the following referred to as the first measuring system and the second measuring system) optionally comprising different sensors (in the following referred to as the first sensor and the second sensor), which measuring systems are operated or controlled independently of one another. The measuring systems can be disposed on different units coupled by no mechanical system, which can be moved relative to a railway network to record the measurement values.

The fact that the measurement values are different may be due to the fact that the measuring methods applied are different. The railroad industry can, among other things, be characterized by the fact that moved measuring methods or stationary measuring systems can be applied to create the measurement values.

The independence of the measuring systems can have a causal meaning. Creation of a measurement value by a measuring system does not necessarily necessitate creation of another measurement value by another measuring system. Creation of a measurement value can be in no logical association with creation of a further measurement value.

Independence of the measuring systems can also be achieved by determining first measurement values at a first time by means of a single measuring system and second measurement values at a second time, wherein determination of the first measurement values and the second measurement values occurs independently.

Particularly in the railroad industry, determination of measurement values at different times is to be valued as a sign of the presence of independent measurements. Such independent measurements can be by temporally independent measuring systems.

Independent creation of the measurement values can also have a mechanical, in its broadest sense: spatial meaning. A first measuring system for creating the first measurement value is independent in a mechanical sense when the measuring system is coupled to a second measuring system by no mechanical system of force. The selection of a first measurement location where a first measurement value is determined by means of the first measuring system is not dependent on the selection of the second measurement location where the second measurement value is determined by means of the second measuring system. By applying the measuring methods of prior art, measurement values are determined using a relative coordinate reference system or an absolute coordinate reference system as a measurement location attribute for localizing the measurement values with different points of origins/zero points. For example, geographical coordinates (geographical longitude and latitude) can be used as an absolute coordinate reference system. Indication of a position in dependence of the traveled distance or transit time is an example of a relative coordinate reference system, which relative coordinate reference system finds use frequently in the railroad industry. The examples of coordinate reference systems given herein should by no means be understood to be exclusive; a person of skill in the art will know further examples of a global reference system and a relative reference system.

A measurement value can comprise a series of measurement value attributes, which measurement value attributes are determined on a series of measurement locations, which series of measurement locations is characterized by a distance between the measurement locations. A measurement value with a series of measurement value attributes can, for example, be determined by moving a measuring system along a railway line or in particular a rail and determining measurement attributes on selected measurement locations. The distance between the measurement locations can be different among individual measurement values and also within one measurement value. The distance between the measurement locations can also approach zero, so that an essentially continuous measurement over a distance is present.

One-dimensional, two-dimensional, or three-dimensional localization is feasible. The individual measurement values can differ by the dimensionality of the localization.

The exact localization of the measurement values in the railway network is an essential factor in a description of a railway network by means of measured or calculated values. It can also be an object of the invention to guarantee as precise a localization of measurement values in the railway network as possible. Furthermore, it is an object of the invention to increase the precision of a measurement location's localization and/or to guarantee compatibility of such localization within the railway network.

By applying measuring methods of prior art, the time of creation of a measurement value is described by a temporal attribute. A such temporal attribute can be present in different temporal formats in the railroad industry in particular.

To sum up, the measurement values describing an element of the railroad industry are heterogeneous due to their different characteristics. The definition of heterogeneity known for computer science shall be applied to the different characteristics of the measurement values (see, for example, https://de.wikipedia.org/wiki/Heterogenitat_(Informatik) (in German)).

The invention disclosed herein has the object of making the measurement values analyzable regardless of the determination time of creating such measurement values and/or of the type of creation for such measurement values and/or of the measuring system used and/or of the method of localizing such measurement values.

Analysis of the first measurement values and the second measurement values together can also comprise displaying said measurement values on, for example and thus not limited to, a monitor or user interface, by means of which display said measurement values or data created from said measurement values can be compared and correlated with one another. The display of the measurement values or data is a step downstream of that method step in which the first measurement values and the second measurement values are made comparable to one another.

A determination time is the time at which the measurement values are determined. The determination time can be a point in time or a period of time. Indication of a determination time in the form of a period of time can be done when the actual determination time is unknown or when the determination of the measurement values takes a period of time.

Furthermore, the invention disclosed herein has the object of processing the measurement values regardless of the determination time of creating such measurement values and/or of the type of creation for such measurement values and/or of the measuring system used and/or of the method of localizing such measurement values in such a way that such measurement values can be used for controlling a machine traveling on the rail. Processing the measurement values can comprise storing them in a database. The machine traveling on the rail can be a rail repair machine or a different vehicle. Processing the measurement values with respect to localization for use in controlling the machine can comprise that the method and the result of localizing the measurement location when determining the measurement value are adapted to the requirements of controlling a machine.

The basic solution provides that the heterogeneous data volume of measurement values with different characteristics be converted into a homogenous data volume with unified measurement value sets.

It is also an object of the invention disclosed herein to produce a system which allows integration of subjective descriptions into a database to be produced.

As initially said, the measurement values present in the railroad industry according to prior art are very different in nature, type of determination, which can in part be explained by the highly nationalized structure of the railroad industry and the different measuring methods. In the discussion of the inventive method below, the different measurement values will be referred to as first measurement values and second measurement values. The first measurement value is thus different from the second measurement value regarding the determination time and/or the measuring method applied and/or the measuring system used etc.

In the method discussed herein, measurement values comprise, like in prior art methods, at least measurement attributes, which measurement attributes—as stated several times in this document—describe a determinable or determined dimension. The measurement values can be localized with different coordinate reference systems as a measurement location attribute and/or with creation times as a temporal format in different temporal formats.

A first measurement value can comprise a first measurement attribute; the first measurement value is localizable by means of a first coordinate reference system and/or a first creation time.

A second measurement value can comprise a second measurement attribute; the second measurement value is localizable by means of a second coordinate reference system and/or a second creation time.

The first coordinate reference system and the second coordinate reference system can be different. For example, the first coordinate reference system can be an absolute coordinate reference system and the second coordinate reference system can be a relative coordinate reference system. The coordinate reference systems can be based on different points of origin/zero points.

The first temporal format and the second temporal format can be different. One temporal format can be, for example, a date, while another temporal format can be an internet time.

The temporal formats can have different zero points.

The first creation time and the second creation time can be different.

The inventive method offers a solution basically by offering unification of the measurement values. Said unification basically comprises the step of converting the measurement values into a unified coordinate reference system and/or converting the measurement values into a unified temporal format and/or converting the measurement values into a measurement value set having a defined structure.

A measurement value set comprises at least localization by the unified coordinate reference system, a measurement value and optionally a temporal attribute or a timestamp. Said data is stored in the database in said unified structure according to a unified scheme.

A temporal attribute is beneficial to document changes in the rail. A person of skill in the art will recognize that the use of a temporal attribute with a unified time designation is beneficial.

In the context of the disclosure of this invention, a measurement value comprises a measurement attribute. Such measurement attribute is determined by measuring by means of a sensor. Such measurement attribute can also be defined by input by a user (subjective value). Such measurement attribute is usually a numerical value (positive numerical value, negative numerical value, amount), a vector or other dimension, which, according to the current teaching, is adequate to describe a property of the object. The measurement attribute can also be an image or link to further measurement attributes or further data. A measurement attribute can be present one-dimensional or two-dimensional or three-dimensional. Regarding the technical problem set out above, the measurement attribute can be present in different formats.

Furthermore, a measurement value comprises an indication of the measurement location (measurement location attribute), in which measurement location the measurement value is determined. According to the current teaching, the measurement location can be defined with sufficient accuracy by a relative coordinate indication or by an absolute coordinate indication. A person of skill in the art knows further options for indicating the measurement location with sufficient accuracy from prior art. Regarding the technical problem set out above, the indication of the measurement location can be given in different formats. The indication of the measurement location by means of a relative coordinate indication or by means of an absolute coordinate indication discussed herein is only a selection from a plurality of possible indications of locations. Furthermore, the accuracy of the indication of the measurement location is a factor of influence when further processing the measurement value, in particular when processing the indication of the measurement location.

Furthermore, a measurement value can comprise a temporal indication (temporal attitude) of the first creation time, at which first creation time the measurement value was determined. Such temporal indication can also be present in different formats. Furthermore, the accuracy of the measurement location is a factor of influence when further processing the measurement value, in particular when processing the indication of the creation time. In the context of the disclosure of this invention, a coordinate reference system can comprise a temporal indication in addition to a positional indication. The measurement location attribute can thus comprise a temporal attribute.

A measurement value can comprise further measurement value attributes. The above description of a measurement value is by no means to be understood as limiting.

The inventive method comprises as a method step calculating the measurement values, which measurement values are determined at a creation time using a relative coordinate reference system or an absolute coordinate reference system for localizing, into a unified coordinate reference system. Such calculation is a mathematical method, in which mathematical method the indication of the measurement location is calculated from an existing coordinate system, which existing coordinate system comprises absolute coordinate indications and/or relative coordinate indications, into a unified coordinate system. In an unpublished research project, universal time and/or geodesic coordinates are used as a unified coordinate reference system.

The inventive method is based on the first measurement values individually rather than a series of first measurement values or a function describing the first measurement values being calculated from the first coordinate reference system into the unified coordinate reference system. The same applies for the second measurement values.

The unified coordinate reference system can be a global coordinate reference system, while the first coordinate reference system and the second coordinate reference system are local coordinate reference systems. A global coordinate reference system can comprise local coordinate reference systems, which are linked to the global coordinate reference system via reference points.

As stated above, a railway network is characterized by an area of a railway line being connected to the railway network via at least one nodal point. A railway line can be connected to the railway network via two nodal points, as illustrated below based on a figure.

A person of skill in the art is capable of selecting a different unified coordinate reference system depending on the respective task.

Calculation from a relative reference system or an absolute reference system into a unified coordinate reference system can be done by applying mathematical models according to the current teaching. Coordinate transformation can be applied.

Calculation from the first coordinate reference system into the unified coordinate reference system can be a purely mathematical task. A task extending beyond such potentially purely mathematical transformation is disclosed in the description of the figures below.

In a relative coordinate reference system, which relative coordinate reference system is based on an indication of a position depending on the distance or the like, which distance can be indicated via the distance and/or time passed since a starting time, a person of skill has to consider the routing at the time of creating the measurement value. The person of skill would also refer to this as localization along the line in the present example.

The routing can be subject to change over time; this has to be considered when processing measurement values with localization by means of a relative coordinate reference system.

The use of universal time and/or the use of geodesic coordinates are given as examples for the use of an absolute coordinate reference system. A person of skill in the art will refer to the use of geodesic coordinate as complete three-dimensional localization of the measurement value.

By transforming the measurement values from the relative coordinate reference system or the global coordinate reference system into the unified coordinate reference system, measurement values become analyzable.

Transformation of the measurement values determined by means of a global coordinate reference system and/or a relative coordinate reference system into a unified coordinate reference system makes measurement values comparable. The comparability of the measurement values to be achieved can require that the measurement values converted into the unified coordinate reference system have the same physical unit or at least a comparable physical unit. Preferably, a person of skill will use SI units. The use of SI units is possible in particular with objective measurement values.

For the sake of completeness, it should be established that a transformation of measurement values from a relative coordinate reference system or a global coordinate reference system into a unified coordinate reference system preferably comprises the use of a unified unit such as an SI unit, for example. This achieves unification of the measurement attributes.

By achieving the technical effect of comparability between measurement values—when performing the inventive method as a computer-implemented method—the further technical effect of integrity is also achieved, so that a manipulation of measurement values or data generated from the measurement values is visible from comparing the measurement values or data, respectively.

The inventive method is characterized by measurement values that have so far not been associated with one another can be compared. For example, measurement values describing a dimension or geometry of the track, such as gauge, slope, curve radius, position, can be compared with infrastructure-specific data, machine parameters, dynamic data in any constellation. The properties of the data given by way of example and not as limiting, in particular extraordinary properties thereof as well as singularities in performing a measurement, can be established in the operation of the railway network.

By achieving the further technical effect of comparability, the accuracy of the measurement values or data determined from the measurement values can be evaluated, whereby a further technical effect is substantiated. Since measurement values represent a property, the term of accuracy is an objective term in that it means the accuracy of representing said property. This can be an essential further technical effect of the inventive method, since the measurement values describing a railway line are determined in nature and thus under the influence of nature. The unified coordinate reference system and/or universal time as a unified temporal format can allow observing the measurement values or the measurement value sets in a selected spatial area and/or temporal area.

A spatial area or temporal area described by measurement values from different measuring methods and/or at different creation times can be selected. For example, a person of skill in the art can select a spatial area of the railway line or the surroundings of said railway line and thereby select a partial area of the measurement values and/or the measurement value sets for analysis or other processing.

Observing a spatial area represents an example of a targeted selection of a partial area of the measurement value sets. The invention disclosed herein has the further technical effect of producing a large amount of data stored in the database as measurement value sets, which amount of data can be reduced to areas of interest in a subsequent step.

The problem of assigning the measurement values or the measurement value set mentioned below to objects of the railway line or its surroundings is discussed several times in the context of the disclosure of the inventive method. Additionally or alternatively to the solutions below, such assignation can be such that it is assumed that only certain objects are present in an area.

The use of a rotation laser scanner has been mentioned initially as an example. It can be assumed, for example, that the substructure or the rails are arranged in a certain area under the rotation scanner when performing a measurement. A person of skill can conclude that the measurement values of an area underneath the rotation scanner describes the rails or the substructure. Analogously, it can be assumed that, for example, the catenary is arranged in an area above the rotation scanner and therefore the measurement values of this area describe the catenary.

Furthermore, the inventive method comprises the method step of generating unified datasets.

The measurement value sets of selected data areas are assessable. This allows for an effective way of observing the data.

A measurement value can comprise measurement value attributes, which measurement value attributes comprise the physical measurement dimension and optionally an indication of the measured object. When a measurement value is put in by a user, the measurement value can comprise measurement value attributes which comprise the measurement dimension and/or a subjective description and/or an objective description and optionally an indication of the measured object. The invention can provide that the measurement value attributes of the measurement values are converted into a unified measurement value set in a structured way. This procedure simply requires a definition of such a structure of the measurement value set and the conversion of the measurement value attributes or measurement values in consideration of said structure.

The unified measurement value set comprises at least the measurement attribute.

The unified measurement value set comprises at least a measurement location attribute using the unified coordinate reference system (localization).

Furthermore, the unified measurement value set can comprise an indication of the creation time in the universal time format (temporal attribute), at which creation time the respective measurement value is created.

In addition to the measurement attribute and the localization, the unified measurement value set can comprise further attributes, which describe the following properties of the measuring system and/or its surroundings.

A further attribute describing the measuring method can be comprises, by means of which measuring method the first measurement values or second measurement values are determined. A further attribute describing a calculating method can be comprised, by means of which calculating method the first measurement values or second measurement values or the unified measurement value set are determined.

A further attribute can describe the surrounding properties or the weather conditions active when the measurement values were created.

A further attribute can describe performing the measurement procedure such as the measuring means, the measuring systems used, the calibration of the measuring means that has or has not taken place, the speed of the measuring means. A further attribute can describe the origin of the data.

A further attribute can describe an indication of the quality of the unified measurement value set. The quality of a measurement value set can be calculated, for example, from a numerical indication or a function describing a resolution of the measuring values, a distance, number of queries of measurement values by user.

The unified measurement value sets can comprise further attributes on access rights, rights of use, reading rights, editing rights or control rights.

The unified measurement value sets can comprise a documentation of the conversion of the localization of the measurement values into the unified localization. Said documentation can, in particular, comprise further attributes, which describe the reference points used in the conversion into the unified coordinate reference system. The conversion of the measurement values or measurement value attributes into the unified measurement value set can be done by input.

The structure of a measurement value set comprises at least structured storing of the measurement value attribute of the measurement value and the localization of the measurement value using the unified reference coordinate system in a database. The storing of the measurement value set can be done in such a way that dependencies of a measurement value are also introduced as dependencies of the measurement value set.

In the simplest embodiment, the unified structure comprises the measurement value attribute and the measurement location attribute of localization of the measurement value attribute by means of the unified coordinate system. Said attributes are stored in a unified manner such as, for example, in a unified data structure in a database.

The term structure is understood to mean the arrangement of parts of a whole or the creation of a homogenous fabric of measurement value sets from heterogeneous measurement values. The measurement value set can consist of mutually dependent parts. In the inventive method, the measurement values and the localization of the measurement values are arranged in a comprehensive database while maintaining the dependencies. The dependency of the measurement values and the localization thereof consists in giving an indication of the localization of the measurement values.

Converting the measurement values into unified measurement value sets with the unified localization brings the benefit of being able to compare the measurement value set created from the measurement values with measurement attributes of a measurement location and thus detect dependencies. A person of skill can employ modern data processing methods for such analysis.

Additionally or alternatively, the measurement values can be verified by applying the method of pattern recognition known according to the current teaching. Measurement values having a certain pattern can be associated with a certain object. Depending on the pattern detected and optionally association of the measurement values to an object, the measurement values can be arranged in the measurement value set. For example, the first measurement values having a first pattern can be arranged in first sites of the structure of the measurement value set (file structure, header in the file structure).

Application of pattern recognition according to the current teaching allows detecting natural influences in the inventive method in particular. A natural influence can be a certain pattern, such as, for example, noise, or simply differ from the other known patterns. Detecting natural influences by means of pattern recognition, which is by no means a trivial technical task, can be complemented by the analysis of the measurement values or measurement value sets, which analysis is facilitated by the inventive method.

The procedure of structuring the measurement values and arranging the measurement values in the data structure, such as, for example, a measurement value set, also considers the technical problem of effectivity in that the number of measurement values is changed into a number which allows an analysis to be of optimal quality. A person of skill can define a number of measurement points and optionally a characteristic of such measurement points.

Different measuring methods can produce a different number of measurement values. Bringing the measurement values into a structure can imply that a defined number of measurement values are considered for further method steps. The latter can comprise subsuming measurement values and/or deleting measurement values and/or adding measurement values.

Furthermore, measurement value sets are generally comparable with a unified structure of the measurement values with less effort, thereby explaining the further technical effect of effectivity. A measurement value set can exclusively comprise first measurement values or first measurement value attributes such as first measurement attributes, first temporal attributes or first location attributes, which first measurement values or first measurement value attributes are determined by means of a first sensor and/or in a first measuring method. A measurement value set does by no means have to comprise first measurement value attributes and second measurement value attributes.

The measurement value set can comprise first measurement values and second measurement values or first measurement value attributes and second measurement value attributes. A such measurement value set can be characterized by the efficient processing of multiple measurement values.

Conversion of the measurement values into a structured measurement value set has the benefit of measurement values being made analyzable independently of their creation time. The structure of the measurement value set allows advantageously performing methods of analysis, which may also have been devised subsequent to the determination time.

To sum up, the inventive method allows comparing measurement values, which measurement values are determined at different times by means of different measuring methods and measuring systems, independently of their creation time. This is discussed by way of example based on the first measurement value and the second measurement value.

The inventive method can be characterized by the first measuring method and the second measuring method being different. For a definition of when a difference between measuring methods is present, reference shall be made to the above description on the differential character of measuring methods.

Furthermore, the inventive method can comprise the step of calculating the creation times into the format of universal time as a unified time format. This method step can be performed by applying the current teaching.

Universal time is introduced in the inventive method as a "unified" temporal format. The measurement values can thereby be compared with regard to temporal development. The properties described by the measurement values can be compared with regard to time.

The achievable benefits stated in the context of the discussion can thus be achieved time-independently.

The inventive method can be characterized by the unified coordinate reference system comprising at least two reference points.

Localization of a measurement location using an absolute coordinate reference system and a relative coordinate reference system is done according to prior art using a single reference point, which is also referred to as the point of origin or zero point.

Converting the localization of the measurement locations of the measurement values into a unified coordinate reference system can comprise that the measurement location in the unified coordinate reference system is localized to at least two reference points of the unified coordinate reference system, by which two reference points the measurement location of the measurement point can be localized in a railway network. The reference points of the unified coordinate reference system are points of the railway network. The reference points of the unified coordinate reference system are preferably reference points of the railway network.

The inventive method can comprise that the measurement values are compared with reference measurement values, which reference measurement values are assigned to a reference object, wherein the measurement values are assigned to an object which is similar to the reference object in case of a defined similarity between the measurement values and the reference measurement values.

This method step comprises at least that the measurement attribute of a measurement value is compared with a reference attribute. Furthermore, the time indication and/or the measurement location indication can be compared with a reference time or reference location, respectively. This method step, if necessary, is performed prior to generating the unified measurement value set. In this method step, the measurement values are processed.

In the same way, a person of skill can compare the object described by a measurement value with a reference object family instead of a reference object. In the context of the disclosure of the invention, unless explicitly mentioned, no distinction is made between the terms reference object and reference object family.

The comparison can, for example, result in the measurement values, which measurement values are determined on a rail of a railway line, being detected as measurement values describing the shape of a rail. The database can comprise indications of which properties the measurement values describing a rail or, in particular, a rail profile should or may have, so that the object described by the measurement values can be identified as a rail or a cross-section of a rail. The facilitated assignation can also be based on the database comprising reference measurement values describing one or more rails. Such reference measurement values can, for example, be based on rail types, which rail types are established in the pertinent standards. The measurement values describing a rail as an unknown object are assigned to a rail as an object based on a similarity of the measurement values and the reference measurement values to be determined.

The example of the rail is given here merely by way of example; this example can also be applied to further objects of a railway line such as catenary, crossties, fasteners for attaching a rail to a crosstie, ballast, catenary mast etc.

The database for matching the measurement values can also comprise standardization values which define a property of an object and/or a further property of an object to a further object, thereby being able to add to the assignation of the measurement values described herein. A standardization value can be a subset of the reference values.

Assignation of the measurement values to objects of the railway line can be done using methods according to the current teaching, which methods are based on the teaching of artificial intelligence and/or the comparison of patterns.

In the context of the assignation of measurement values to reference objects described herein, a person of skill can employ prior-art methods such as, for example, neural networks to conduct an evaluation of the measurement values for similarity. Optionally, the assignation of the measurement values to a reference object is done by computing an indication of the probability according to which the measurement values match the reference object.

The measurement value set can comprise an indication of the reference object assigned to a measurement value and of the probability determined.

The inventive method can be characterized by the measurement value set being compared with a reference measurement value set, which reference measurement value set is assigned to a reference object, wherein the measurement value set is assigned to an object which is similar to the reference object in the case of a defined similarity between the measurement value set and the reference measurement value set.

In analogy with the assignation of measurement values additionally or alternatively to the assignation of the measurement values, the generated measurement value sets can be assigned to an object. A person of skill will recognize that said assignation is done essentially similarly to the assignation of measurement values, while not measurement values, but measurement value sets are observed.

Observing measurement value set rather than observing measurement values in the context of assigning measurement value sets or measurement values, respectively, has the benefit that, due to the defined data structure of the measurement value sets, such observation and assignation of measurement value sets can be performed much more efficiently and exactly.

Furthermore, observing measurement value sets implies that at least two measurement values are compared with a reference measurement value.

It can include in the measurement value set an indication of the assignation of the measurement value set to a reference object and of the probability determined.

The inventive method can be characterized by the measurement value set being complemented by a temporal attribute describing the creation time of the measurement values (or also referred to as measurement point) and/or the creation of a measuring mark, which measuring mark is described by the measurement values or at which measuring mark the measurement values are created.

This method step can concern the case that the measurement value comprises no temporal attribute describing the creation time of the measurement value.

The inventive database and the inventive method for creating said database are generally characterized by the measurement value sets being put into the database independently of the creation of the measurement values, i.e., for example, the performance of the measuring method. If the measurement values comprise no temporal attribute describing the creation of the measurement values, addition of a temporal attribute on the creation of the measurement values can allow traceability of the data in general.

In the interest of and for achieving traceability, the measurement value set can comprise a temporal attribute describing the creation of the measuring mark, at which measuring mark the measurement value is determined and at which measuring mark the measuring method is performed.

The inventive method can be characterized by the measurement value set being complemented by a temporal attribute describing the time of creating the measurement value set.

Introduction of said temporal attribute is essentially associated with an indication of the time of processing the measurement values into the measurement value set.

This inclusion of the temporal attribute allows applying methods of block-wise signature of the measurement value sets to thereby achieve the further technical effect of integrity.

Conversion of the measurement values and the measurement value attributes into the measurement value set is done by data processing. The addition of a temporal attribute describing the time of including the measurement values and/or the measurement value attributes into the measurement value set can allow traceability of the data processing as a further technical effect.

The measurement value set can comprise temporal indications in the form of temporal attributes, by which temporal indications it is established when which measurement value or which measurement attribute is determined. A person of skill will recognize that a temporal description of the determination of the measurement values or the measurement attributes can be created in an effective manner here by a mathematical description.

The inventive method can be characterized by the measurement value set being complemented by a mathematical model describing the measurement values.

A possible description of the measurement value sets by a mathematical model can also be regarded as a beneficial further technical effect, which effect is created by the inventive creation of the database. A description of a plurality of measurement values by a mathematical model is usually to be regarded as the efficient storing of measurement values, which form of storing can further allow efficient data processing.

A description by means of a mathematical model can be, for example, the description of a temporal change in measurement attributes. In prior art, this can be done via a mathematical function.

According to the current teaching, a plurality of measurement values are within a range to be defined and some measurement values are outside this range. The mathematical model can be limited to precisely highlighting the measurement values outside the range.

A person of skill knows further options of advantageously describing the measurement values with a mathematical model.

The inventive methods can be characterized by the ability to put the measurement values into the database independently of the creation time. According to the invention, it can be achieved by temporarily storing data comprising measurement values and/or measurement value sets in a cache.

The measurement values can also be put into the database after determining the measurement values or after establishing the measurement values. This also includes adding further measurement value sets to the database constantly and thereby independently of a creation of further measurement value sets.

The measurement values can be read from a further database and/or from a cache. The inventive method can be based on the measurement values being transferred to the inventive database by means of data transfer. Said data transfer usually takes place via radio or wired connections. Since railway lines also run through regions with poor radio coverage or insufficient wired connections, the measurement data can also be stored in a cache prior to conversion into the database. Storing measurement value sets in the cache would also be feasible.

In the context of the disclosure of the invention, a note made by a person of skill in the art can also be regarded as a cache. A cache can also be a handwritten note by a person of skill.

The inventive method is thus by no means limited to the database being stored in a computer network. The database can comprise partial databases, which partial databases are separated from the network at least for a period of time.

The inventive method can be characterized by a priority factor being attributed to the measurement value set or the measurement values comprised by the measurement value set.

A relevance can thus be attributed to a measurement value set or the respective measurement values.

The priority factor can be assigned under the aspects of integrity of values and/or accuracy of values described below.

The priority factor can also be selected depending on the measuring method applied to determine the measurement values.

A first measurement can supply a first number of measurement values, while a second measurement supplies a second number of measurement values.

When comparing measurements of, for example, a rail, the actual number of measurement values to be observed can be adapted by introducing priority factors via a weighting achievable by the priority factor. Those measurement values which exceed a required or maximum number of measurement values can be attributed low priority.

A person of skill can establish a group of measurement values with high priority depending on an assignation of measurement values or measurement value sets to a reference object.

The inventive method can be characterized by matching the first measurement values and the second measurement values and/or a first measurement attribute with another first measurement attribute and/or a second measurement attribute with another second measurement attribute and/or the measurement values with reference measurement values and/or the measurement value set with a reference measurement value set.

By generating the structured measurement value sets, the first measurement values and the second measurement values become comparable with one another. Furthermore, the first measurement value attributes become comparable with the second measurement value attributes. A person of skill will recognize that such a comparison presupposes a functional meaningfulness of the values to be compared.

A comparison of values can guarantee verification of values. The inventive method and an inventive database can thus be characterized by a high degree of integrity.

A comparison of values can guarantee an accuracy of the values; inexact values can be eliminated or assigned low priority. The inventive method and an inventive database can thus be characterized by a high degree of accuracy.

By comparing values with reference values, a minimum of quality can be verified.

The inventive method can be characterized by computing additional first measurement values from the first measurement values or additional first measurement value attributes from the first measurement value attributes and/or computing additional second measurement values from the second measurement values or additional second measurement value attributes from the second measurement value attributes.

The above description of the inventive method comprises assigning measurement values based on a matching of said measurement values with reference values, where different methods of prior art can be applied.

Relating measurement values from different sources and of different sensors can produce the technical problem that the measurement values and/or the measurement value attributes comprised by the measurement values are incomplete. This can, for example, be due to the different sensors determining a different number of measurement values and/or measurement value attributes. Furthermore, the number of measurement values and/or measurement value attributes can be incomplete because the measuring method was defective.

The inventive method can comprise that matching of measurement values also comprises creating additional measurement values or measurement value attributes or measurement value ranges of measurement value attribute ranges based on the reference values. The additional measurement values or measurement value attributes can be marked. Interpolation methods of prior art can be employed. This method step is explained by way of example based on a figure below. The object represented in the figure is to be regarded as an exemplary object; a person of skill in the art can perform this method step on further objects of a railway line.

The inventive method can by characterized by a measurement value or measurement value attribute/measurement attribute is verified by matching it with a reference measurement value or reference attribute.

As explained above, the inventive method can comprise the method step of matching the measurement value with reference measurement values or that of matching the measurement value attribute with reference attributes. Comparison of multiple values with multiple reference values allows determining doubtful or questionable values, which doubtful values are defined as those measurement values or measurement value attributes which vary from the reference value or reference attribute, respectively, by a difference value greater than a threshold value. The inventive method can comprise that such doubtful measurement values or measurement value attributes are marked as such.

The inventive method can be characterized by a mathematical model describing the individual measurement value sets and/or multiple measurement value sets is created and said mathematical model is stored in the database.

The mathematical model can describe an individual measurement value set. The mathematical model can describe a temporal course of a measurement value set.

The mathematical model can describe the correlation of multiple measurement value sets. The mathematical model can describe the temporal development of said correlation.

The invention disclosed herein also relates to a database, which database is created by a method according to the above description.

The database can be part of a network, which is built upon wired connections and/or radio connections.

The database or part of the database can also be installed on a device on which a device for determining the measurement values is installed. The database or the part of the database can be installed on, for example and thus by no means limited to, a railway construction machine.

The inventive database can comprise user-specific write permissions and/or read permissions and/or process permissions.

The invention disclosed herein also comprises a database, which database is stored in a storage medium or in multiple storage media.

BRIEF DESCRIPTION OF THE DRAWINGS

The invention is additionally explained based on the following embodiments illustrated in the Figures.

DETAILED DESCRIPTION

Figure 1:
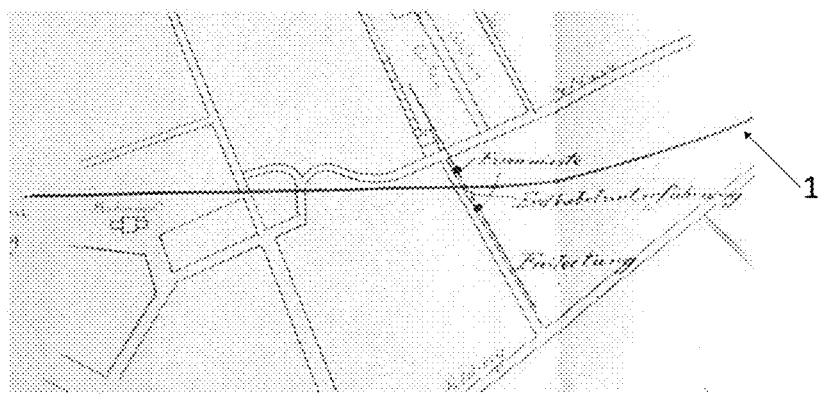
FIG. 1 shows an old map of a railway line.

The embodiments shown in the Figures merely show possible embodiments, while it should be noted at this point that the invention is not limited to these specially illustrated variant embodiments, but that combinations of individual variant embodiments among one another as well as a combination of one embodiment with the general description given above are also possible. Such further possible combinations need not be explicitly mentioned, since such further possible combinations are within the skill of the person of skill in the relevant art based on the teaching on technical practice by the present invention.

The scope of protection is dictated by the claims. However, the description and the drawings are to be used in interpreting the claims. Individual features or combinations of features from the various embodiments shown and described can as such be autonomous inventive solutions. The object underlying such autonomous inventive solutions can be taken from the description.

In the Figures, the following elements are designated by the previous reference numerals:

1 railway line
2 computer method step
3 first measurement values
4 second measurement values
5 first measurement value set
6 second measurement value set
7 database
8 reference profile
9 first layer describing track properties
10 second layer describing track integration
11 maintenance pillar
12 track data pillar
13 operational data pillar
14 track fixtures
15 track
16 first measurement location
17 second measurement location
18 measuring range
19, 20, 21 measurements
22 bis 26 distances
GMW track measurement values
GEB track fixture measurement values
TOPO topology
ARKS absolute reference coordinate system
RRKS relative reference coordinate system
SNW rail network
GNW track network
ACC accounting
VZG directory of permitted speeds
ORG ST organizational structure FIG. 1 shows a detail of an image of a map comprising a railway line 1 (source: https://www.ebay.de/itm/Braun-schweig-Schoeninger-EISENBAHN-Plan-1913-Kreuzung-mit-Kabel-SCHOPPENSTEDT-/153669849176). The map is dated 3 May 1913. The map relates to a region of modern-day Lower Saxony.

Figure 2:
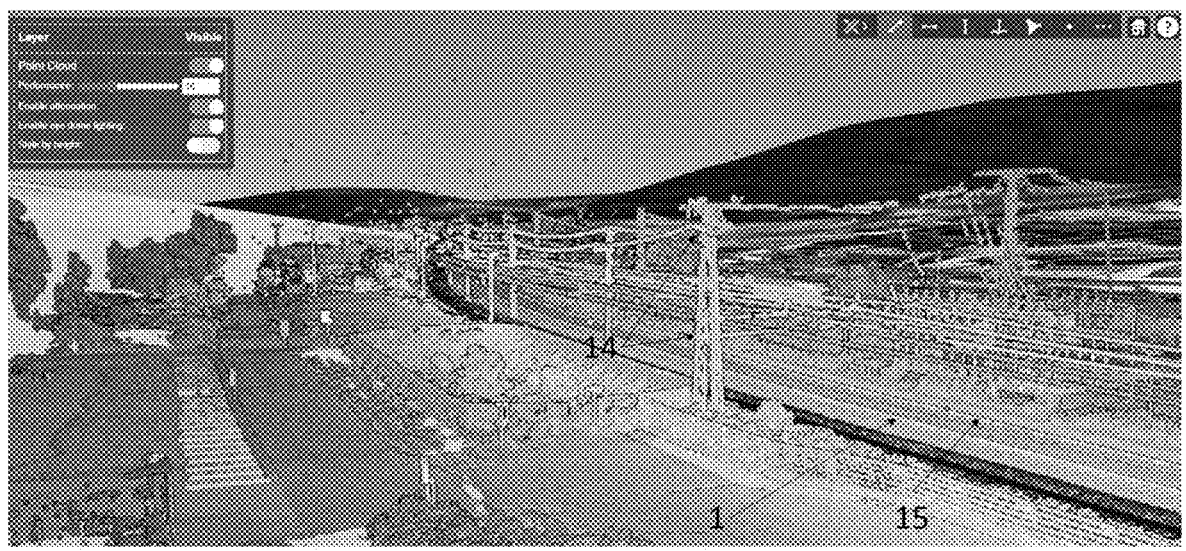
FIG. 2 shows an illustration of measurement values which are determinable by means of rotation scanner, FIG. 3 comprises a schematic representation of the inventive method.

FIG. 2 shows an image comprising measurement values, which measurement values are determined by means of a rotation scanner common in prior art.

As explained above, the invention disclosed herein faces the object of integrating measurement values relating to the railway line—irrespective of their type and independently of their creation time—in a database to make the measurement values analyzable. For example, the invention faces the technical task of uniting in a database and making analyzable first measurement data such as, for example, the map data shown in FIG. 1 as first measurement data from the year 1913 as the first creation time and the second measurement data shown in FIG. 2 from the year 2020 as the second creation time. Since a railway line is subject to fundamental changes over more than one hundred years and, for example, a railway line does no longer follow its original artery in large parts, the task mentioned herein can also relate partial areas of a railway line. Analyses of the measurement data can comprise, for example, comparing the data and/or correlating the measurement data with one another.

The map data included in the map illustrated in FIG. 1 is measurement data. Measurement data in the narrowest sense of the term is certainly present when the map is, for example, scanned or edited in some other form. The first coordinate reference system is given by the map representation; the first coordinate reference system is the coordinate reference system if the map or the map representation.

FIG. 2 shows an illustrated result of a measurement by means of a rotation scanner; a such measurement is prior art and requires not further explanation in the context of the discussion of the inventive method. The second coordinate reference system is given by the orientation of the rotation scanner and/or the movement of the rotation scanner.

A layperson will recognize how the data as illustrated by FIG. 1 and by FIG. 2 are generally different.

For example, and thus not in a limiting sense, the first coordinate reference system is a coordinate reference system given by the map and therefore rigid. The measurement values are represented or readable once. The second coordinate reference system is a changeable coordinate reference system upon movement of the rotation scanner. By means of a rotation scanner, which is active upon movement along a railway line, measurement values can be determined at a position of the rotation scanner in a partial area from which measurement values are also determined at a second position of the rotation scanner. For example, the first measurement values are present in paper form, while the second measurement values are present as electronically stored data.

All in all, the first measurement values and the second measurement values form a heterogeneous data volume, as shown by way of example based on FIG. 1 and FIG. 2. It is a task of the inventive method discussed herein to create a homogenous data volume out of said heterogeneous data volume.

The inventive method faces the task of uniting in a database and thus making analyzable in the sense of relating or comparing the measurement values first measurement values or, in general, data from, for example and thus by no means limited to, a map representation (see FIG. 1) and second measurement values/data from, for example and thus by no means limited to, a modern measuring method. In general, it is achieved by the method step of transforming the measurement values into a unified coordinate system and by the method step of structuring the measurement values or data that originally unanalyzable data become analyzable together.

FIG. 2 shows, by way of example, the illustrated measurement values describing a railway line 1 with track fixtures 14 and a track 15. Reference to the track fixtures and the track 15 is merely by way of example; all that is essential in the context of discussing the inventive method is that it involves measurement values describing element relating to a railway line.

Figure 3:
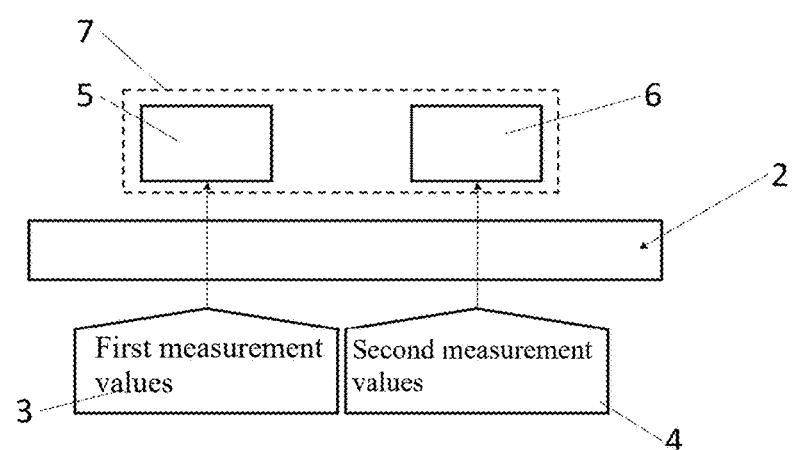

FIG. 3 illustrates the inventive method in a detailed manner. The method can be performed as a computer-implemented method, wherein the rectangle symbolizes the method steps 2 performable by means of a computer, which method steps will in the following be referred to as computer method step 2 due to preferred, albeit not exclusive execution by means of a computer.

First measurement values 3 and second measurement values 4 are delivered to the computer method step 2. As described above, the measurement values 3, 4 can be determined at different determination times or in different determination periods by applying different measuring methods. The measurement values 3, 4 can in general comprise subjective or objective values, which values are further related to the railroad industry or the railway line.

The measurement values 3, 4 can relate to objects of the railway line as such, such as rails, crossties, rail fastening means, rail bed etc.

Furthermore, the measurement values 3, 4 can relate to objects in the surroundings of the railway line, such as vegetation, railway fixtures such as platforms and crossings. The measurement values 3, 4 can equally relate to values describing the properties of the surroundings, such as groundwater level, snow level etc.

Furthermore, the measurement values 3, 4 can relate to objects traveling on the railway line or in the surroundings of the railway line. The measurement values 3, 4 can, for example, be values describing the operation of a rail vehicle (i.e., track construction machine) for constructing or maintaining the railway line; the measurement values 3, 4 can relate to power input, oil pressure, speed etc. of such rail vehicle.

The measurement values 3, 4 comprise at least one measurement attribute and one measurement location attribute. Furthermore, the measurement values 3, 4 can comprise a temporal attribute.

The measurement attribute is essentially the dimension measured by the sensor. The measurement attribute can be a numerical value, a vector or another mathematical dimension given according to the current teaching.

The measurement attribute essentially relates to the localization of the measurement location where the measurement is performed or the localization of the measuring mark. The localization can be indicated by a relative coordinate system or by an absolute coordinate system.

The temporal attribute relates to the creation time at which the measurement value is created.

The different measuring systems which are used to create the measurement values use different methods of localization and different temporal formats to indicate the creation time.

Said indications of the first measurement values 3 and the second measurement values 4 are by no means to be regarded as limiting. A person of skill in the art knows further measurement values in addition to the measurement values listed by way of example, which measurement values can be associated with a railway line.

The computer method step 2 comprises at least the method step of transforming the measurement values 3, 4 from the method of localization applied when determining the measurement values or when storing the measurement values into a unified coordinate reference system, wherein the method discussed herein is exclusively based on the application of methods of localization known in prior art. According to the current teaching, localization is a positional indication using an individual coordinate reference system.

The computer method step 2 comprises the method step of transforming the measurement values 3, 4 from the coordinate reference system applied when determining the measurement values or when storing the measurement values into a unified coordinate reference system. The coordinate reference systems used are usually relative coordinate reference systems or global coordinate reference systems, wherein the measurement values are converted from the coordinate reference system used into the unified coordinate reference system by applying the current teaching of coordinate transformation.

Localization using a relative coordinate reference system can be such that the distance along the railway line is determined from a starting point, whereby the measurement location is described with sufficient accuracy. The distance can be described directly as a distance from the starting point or as a sum of distances between the measurement locations. This kind of localization requires not further explanation, since this kind of localization is known in prior art.

Localization using an absolute coordinate reference system can be executed in such a way that the measurement location is determined by means of GPS equipment. This kind of localization is also known according to the current teaching and requires no further explanation.

It is also feasible in addition to the direct methods of localization mentioned hereinabove that the localization is indirect. For example, the measurement location can be measured using a relative coordinate reference system, and a localization of said measurement location computed using an absolute coordinate reference system.

Furthermore, the computer method step 2 comprises the method step of calculating the temporal format on which the temporal attribute is based into a unified temporal format such as the universal time format, for example.

In the map shown in FIG. 1, there are measurement values which are indicated in the coordinate reference system of the map.

In the measurement values illustrated in FIG. 1, which measurement values are determined by means of a rotation sensor such as, for example, a rotation laser scanner, measurement values exist in a global coordinate reference system or in a relative coordinate reference system. The relative coordinate reference system can be given, for example, by indicating the position of a measuring train on the railway line. If multiple sensors are arranged to determine measurement values on a measurement train, the position of the sensors on the train must also be considered.

The computer method step 2 also comprises structuring the measurement values in general. The solution demonstrated by the inventive method provides that the measurement values be converted into a unified measurement value set with a defined structure. A unified measurement value set comprises at least one measurement value attribute and a measurement location attribute; reference shall in particular be made to the above description.

Conversion of the measurement values into the measurement value set can generally be performed by means of an input by a person. A person of skill will recognize that conversion of the measurement values into the measurement value set—depending on the data volume—can be a very laborious procedure.

A measurement value set can thus comprise the measurement attributes (first measurement attribute, second measurement attribute), a temporal attribute and measurement location attributes. The measurement value attributes of the measurement value sets are present in a unified format.

The measurement values usually follow a certain pattern, which can be identified and described by applying the current teaching of mathematics.

For example, the measurement values describing the course of the railway line in the map shown in FIG. 1 follow the pattern of the line extending across the map at a defined line width. The data acquired by scanning the map can be filtered in consideration of said pattern.

A person of skill in the art will recognize that the measurement values can be assigned to objects in general via detection of a pattern of the measurement values. Pattern recognition is a method according to the current teaching and applied, for example, in image processing.

The inventive method can comprise that the measurement values are arranged according to a given structure depending on a recognizable pattern of the values in the measurement value set.

The measurement values are arranged in measurement value sets. The example shown in FIG. 3 discloses the special case that the first measurement values 3 are converted into a first measurement value set 5 and the second measurement values 4 are converted into a second measurement value set 6. Other embodiments are also feasible.

Preferably, but by no means exclusively, the measurement value sets 5, 6 are stored in a database 7. The database 7 can be part of a cloud solution or another network, so that those values present in a structured form can be accessed site-independently. The measurement value sets 5, 6 can be used for the construction and/or maintenance of a railway line. The measurement value sets 5, 6 can be used for controlling track construction machines.

Figure 4:
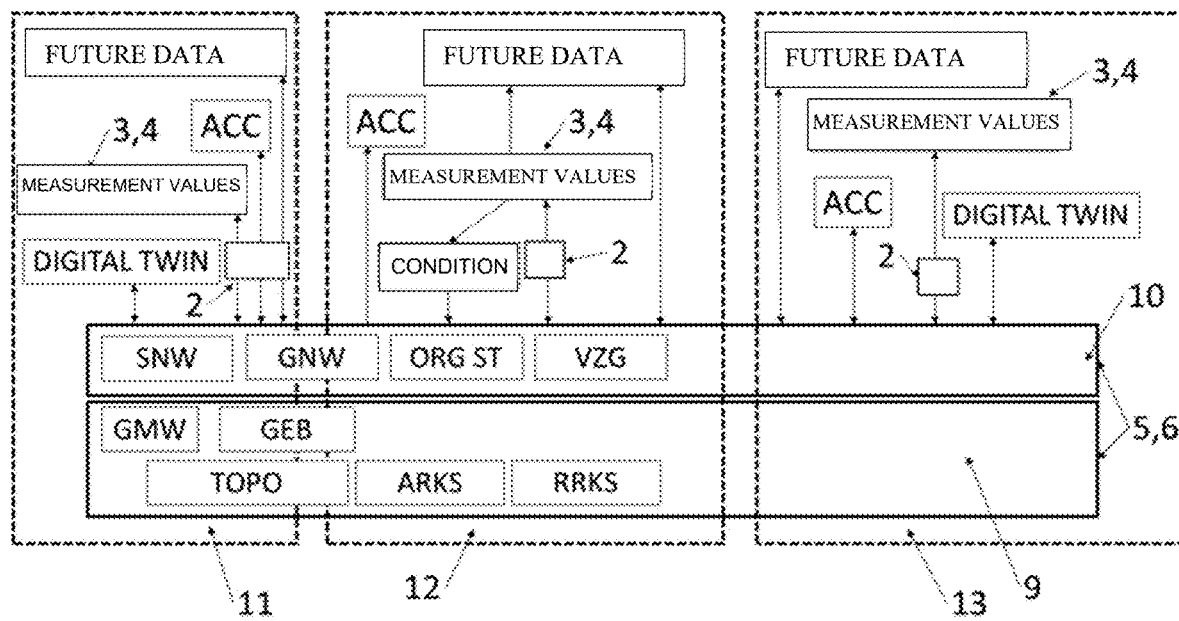
FIG. 4 illustrates the handling of measurement values.

FIG. 4 illustrates the nature of the inventive method and its further technical effect derivable therefrom.

Measurement values 3, 4 are determined according to the current teaching.

Three pillars can essentially be made out in observing the measurement values 3, 4 in the railroad industry and in the management of such measurement values, i.e., the pillar of maintenance machines 11, the pillar relating to the track and the network 12 and the pillar of operation 13. This structure according to the three pillars as shown in FIG. 4 essentially corresponds to the way the works are divided.

Operation is performed by railroad companies such as Deutsche Bahn AG or ÖBB-Personenverkehr AG.

Determination of measurement values is performed by businesses specializing in metrology.

Maintenance work is largely performed by construction companies.

Once the railway network essentially exists, simplified reference shall be made to the maintenance pillar 11, which maintenance pillar 11 comprises, in a manner obvious to a person of skill, in addition to maintenance the construction of parts of the railway network. The operation pillar 13 essentially relates to utilization of the tracks for transporting persons and/or cargo on this infrastructure.

The measurement values 3, 4 can be from the track pillar 12. As shown above based on FIG. 1 and FIG. 2, they can be first measurement values 3 and second measurement values 4, which measurement values 3, 4 are not analyzable together. Only first measurement values can also be determined, which first measurement values describe a track.

The measurement values 3, 4 can also be from the maintenance pillar and/or from the track pillar 12 and/or the operation pillar 13.

The measurement values of the maintenance pillar 11 can be measurement values which describe the operation of railway construction machines or maintenance machines or the transportation of construction materials such as track construction materials etc. A track tramping machine or a track adjusting machine shall be given as an example—therefore not as limiting—of a maintenance machine. Construction material can be, for example and therefore not limiting, a rail, a crosstie or ballast.

The measurement value set of the operation pillar 13 describe the utilization of the railway structure. For example, and thus not as limiting, it shall be noted that the measurement values of the operation pillar 13 can be passenger figures, a number of trains, an indication of a delay.

In prior art, it is possible to analyze the measurement values within a pillar. In prior art, the measurement values 3, 4 describing a condition of a track can be analyzed. A condition of the tracks can be derived from said measurement values 3, 4 and/or future data can be determined by applying methods of predictive analysis. This is possible exclusively in this limited form within the respective pillar and under the prerequisite of the possibility of analyzing the measurement values 3, 4 together.

The inventive method offers essentially two solution approaches to the present problems of a lack of analyzability of measurement values from the railroad industry, wherein the inventive method is characterized by the two solutions being generally similar to the technical problem of the lack of analyzability of data. The method discussed can be adequate for solving both technical problems by a single solution approach.

The measurement value set of only one pillar can be brought into a form so that they are analyzable together. This is shown by way of example based on FIG. 1 and FIG. 2, wherein FIG. 1 shows an old map and FIG. 2 shows the result of a current measuring method. A person of skill will recognize that measurement values of pillar 11 or measurement values of pillar 13 are made analyzable together in a similar way.

Modern methods of data processing such as the application of neural networks, for example, require a very large data volume. It generally applies that a more exact result can be achieved with a larger data volume. In other words, the data volume underlying an analysis cannot be large enough.

The further basic approach of the inventive method is to make the measurement values analyzable together even between the pillars; the inventive method accomplishes this by a similar solution approach and therefore allows for a procedure that is easy for the operator.

For example, a measurement value of the operation pillar 13, which measurement value describes, for example, a (recurring) delay of a train, should be made analyzable with a measurement value of the track pillar 12, which measurement value describes the condition of the track or the surroundings of the track, and/or with a measurement value of the maintenance pillar 11, which measurement value describes, for example, the way a track crossing is constructed. By making those measurement values analyzable together, in short, the volume of analyzable data is increased, and the modern methods of data processing are thus made actually employable.

For example, by analyzing the measurement values together, a delay of a train can be explained by the condition of a track in the area of a railway crossing, while the measurement values from other railway crossings show that the construction type of the railway crossing is not suitable for operating a train with a certain weight.

The examples mentioned herein are by no means to be regarded as limiting. Also, the method disclosed herein is not targeted at the possible analyses but to making the measurement values analyzable together. The possible analyses are a further technical effect which can be achieved by the inventive method.

According to the invention, this is achieved by producing a database for detecting comprising objects of a railway line. Said database extends at least over two of the three pillars; preferably, the database extends over all three pillars 11, 12, 13. For this purpose, first measurement values 3 and second measurement values 4, which measurement values 3, 4 describe a condition of the railway line or of a vehicle traveling on the railway line or an operating condition, are stored in the database by performing coordinate transformation of the absolute or relative coordinate reference system used into a unified coordinate reference system and by generating a unified measurement value set 5, 6 comprising the first measurement values and/or the second measurement values. In generating the measurement value set, the measurement value attributes of the measurement values are stored in a defined structure in the unified measurement value set. The inventive method can be applied both exclusively to one pillar and to multiple pillars according to the above definition.

By the coordinate transformation and generation of a unified measurement value set described above, a standardization of measurement values is achieved. Since this can be applied to all measurement values of the individual pillars 11, 12, 13, the measurement value sets 5, 6 are shown in FIG. 4 by means of a rectangle extending across all pillars 11, 12, 13. Analysis of the measurement values 3, 4 together can be performed such that the measurement value sets 5, 6 are compared.

Preferably, the measurement value sets 5, 6 are structured in two layers 9, 10, via which layers 9, 10 the dependency between the measurement values 3, 4 and the localization of said measurement values 3, 4 is defined. This structure is efficient because the structure describing in detail below allows comparing the measurement values 3, 4 of one pillar out of pillars 11, 12, 13 and also comparing measurement values 3, 4, from two pillars out of pillars 11, 12, 13.

For example, a localizing indication can be connected to a first measurement value 5 of a pillar out of pillars 11, 12, 13 and a second measurement value 6 of a second pillar out of pillars 11, 12, 13.

The measurement value sets 5, 6 can comprise a first layer 9 with values describing the track properties and a second layer 10 with values describing the inclusion of the tracks in the railway network.

In the following, the following values are comprised by the layers 9, 10 by way of example and thus not limitation.

The first layer 9 comprises track measurement values GMW. The track measurement values GMW are essentially measurement values that are determined on a track comprising at least rails, crossties, understructure. The track measurement values GMW also describe the surroundings of the track.

The first layer 9 comprises values describing track fixtures GEB, i.e., structures built in the area of the track or the surroundings. The track fixtures can be, for example, a railway crossing, a catenary mast, a platform or the like. The given examples are not to understood as limiting.

Furthermore, the first layer 9 can comprise indications of the topology TOPO of the track measurement values and the track fixtures. Furthermore, the GMW and the GEB are linked to an absolute reference coordinate system ARKS and/or a relative reference coordinate system RRKS as a unified reference coordinate system.

A person of skill in the art will recognize that the first layer 9 is expandable.

The second layer 10 relates to the inclusion of the track in the railway network. Accordingly, the second layer 10 comprises values related to the rail network SNW, the track network, GNW, the organizational structure ORG ST and the directory of permitted speeds VZG.

A person of skill in the art will recognize that the second layer 10 is expandable.

A measurement value set 5, 6 comprising the first layer 9 described above and the second layer 10 described above allows analyzing the measurement values 3, 4 from different pillars 11, 12, 13 in an efficient form. While the measured values, i.e., the first measurement values 3 and the second measurement values 4 as well as the localization of said measurement values are deposited in the first layer, the crosslinking of the values of the first layer 9 is deposited in the second layer 10. The structure in the sense of the above definition is thus produced on two levels in the exemplary embodiment shown in FIG. 4, i.e., the first layer 9 and the second layer 10.

The following possible results of matching the measurement values from at least two pillars out of the three pillars are listed here by way of example:

The "Digital Twin" method DIGITAL TWIN allows simulating processes. The processes simulated by means of "Digital Twin" can relate to the repairing works and/or the operation. A possible technical effect is performing such a simulation for repair works in consideration of measurement values from pillar 12 and/or pillar 13, which measurement values are determined over a time period.

An essential point in the area of railway management is predictive engineering as known from the current teaching. Based on the data volume available, it is to be detected when a track needs repair, for example. As initially mentioned, this can be predicted with greater accuracy with a larger data volume. The invention discussed herein delivers this larger data volume, wherein the measurement values 3, 4 from all pillars can be included. Furthermore, the temporal development of measurement values 3, 4 can be considered.

Accordingly, internal and external accounting ACC can also be designed more efficiently.

To sum up, at least the measurement values of the said pillars 11, 12, 13 form a heterogeneous data volume. As the measurement values of one of pillars 11, 12, 13 are determined by different providers or different measuring methods or different measuring systems, the measurement values of one of pillars 11, 12, 13 also usually form a heterogeneous data volume.

Producing a homogenous data volume in the form of the unified measurement value set described herein produces the benefit of being able to use the measurement values in the form of the unified measurement value set independently of the way the measurement values are determined for analyzing other measurement values or the properties of the railway network or for controlling machines.

Figure 5:
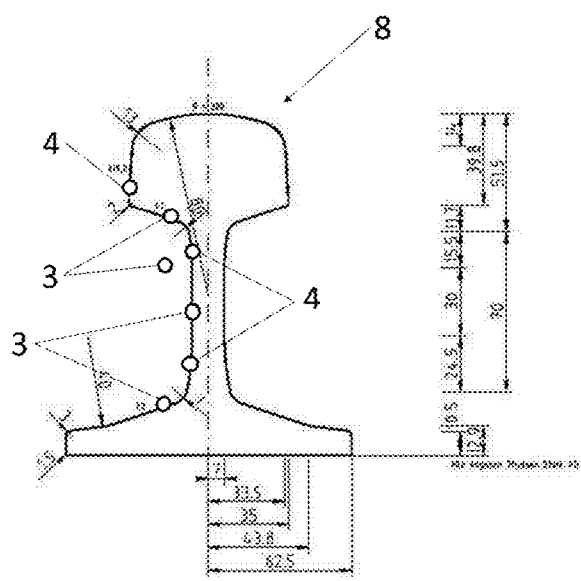
FIG. 5 illustrates a further embodiment of the inventive method.

FIG. 5 shows the profile of a rail as found in the literature (see http://www.jagsttalbahn.de/schienen0.html). In prior art, a first provider who creates first measurement values 3 with a first measuring method using a first coordinate reference system can compare the first measurement values with the reference profile 8 cited in the literature (like stored in a database). Likewise, a second provider, which second provider creates second measurement values 4 with a second measuring method using a second coordinate reference system, can compare said second measurement values 4 with reference profile 8. The inventive method allows analyzing the first measurement values and the second measurement value 4 together. While measurement values in prior art are complemented exclusively including reference profile 8, the inventive method allows calculating additional first measurement values 3 by including the second measurement values 4. In an analogous manner, the inventive method can allow the first measurement values 3 and the second measurement values 4 to be matched in addition to a matching of one measurement value against reference profile 8. This is done in particular in an effective manner, since the measurement value sets have a structured form.

FIG. 5 shows, by way of illustration, the application of a possible method step of the inventive method using the example of a rail profile, wherein the explanation given with respect to said rail profile example is by no means to be evaluated as limiting. Said method steps can be applied to measurement values and reference values in general.

Figure 6:
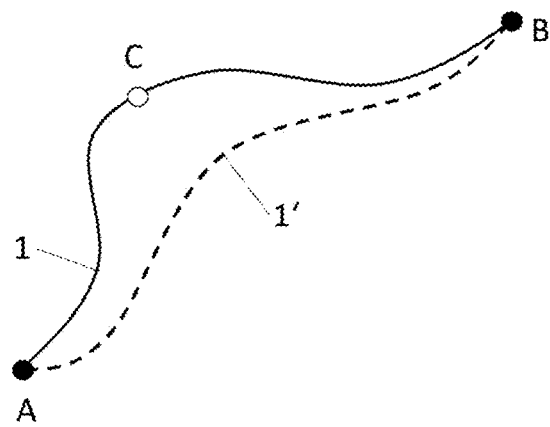
FIG. 6 illustrates an advantageous effect of the inventive method.

FIG. 6 illustrates the problem of calculating the measurement values from a relative coordinate system into a unified coordinate system with geodesic coordinate indications. Furthermore, FIG. 6 illustrates the advantageous effect of the inventive method using an example that has been deliberately kept very simple.

In the railroad industry, a location (see FIG. 6, point C) is usually indicated by a relative coordinate system. This can be done, for example, by a distance starting from a starting point A. Localization of point C in space based on the traveled distance A→C presupposes knowing the course of the railway line at the time of creating the measurement value at location C. The points A and B added in FIG. 6 shall be known locations in the context of discussing the invention; the distance between the locations is irrelevant.

The invention discussed herein solves this problem of localizing a first measurement value determined at location C via creating a unified first measurement value set. The unified first measurement value set comprises, in addition to the first measurement attribute, a first creation time of creating the first measurement value and the relative localization of the first measurement point C.

The first measurement value comprises at least the first measurement attribute. The first measurement attribute can, by way of example and thus not limitation, be a machine parameter like hydraulic pressure of a tramping device.

The first measurement value can comprise a temporal attribute, which temporal attribute describes the first creation time with sufficient accuracy. The first creation time, for example, is understood to mean, with reference to the representation in FIG. 6, the description of the time at which the first measurement value is created by means of a first sensor, with sufficient accuracy. It is essentially a characteristic of the first sensor that a fest temporal attribute is created in addition to the first measurement attribute.

The first measurement value comprises a first measurement location attribute. The measurement location attribute describes the measurement location C using a relative coordinate system. Said relative coordinate system comprises, by way of example and thus not limitation, the indication of the distance on measurement location C from point A. The distance can also, for example, be indicated indirectly via the speed and time period when moving a measurement train from A to C.

Furthermore, second measurement values are present. The second measurement values, with their measurement attributes, relate to the description of railway line 1 at time 1 (creation time) and the description of the railway line 1' at the time t'. The second measurement values are based, for example, on an absolute coordinate system.

By calculating the measurement values from the existing coordinate system into the unified coordinate system and calculating the creation times into a unified temporal format, the measurement values become comparable.

With reference to the representation in FIG. 6, the calculation of measurement values described above allows assigning the relative coordinates of the first measurement point C to second measurement values, which second measurement values describe the railway line 1 at the location C in absolute coordinates at the time 1, which second time is similar to the first time. As a result, the point C can be additionally localized by means of relative coordinates by absolute coordinates or by the unified coordinate system.

A railway line changes its properties such as, for example, its form, over a time period. In FIG. 6, a railway line 1 at a time t is represented by a continuous line by way of example. The dashed line designates the course of a railway line 1' at a time t−1.

In addition to the assignation described herein of the measurement values shown in FIG. 6, further measurement values can be assigned and brought in dependency on one another. The measurement values can in particular be brought in temporal dependency on one another independently of the observation time and the creation time of the measurement values. Databases can hereby be created according to the current teaching based on the railway data.

Figure 7:
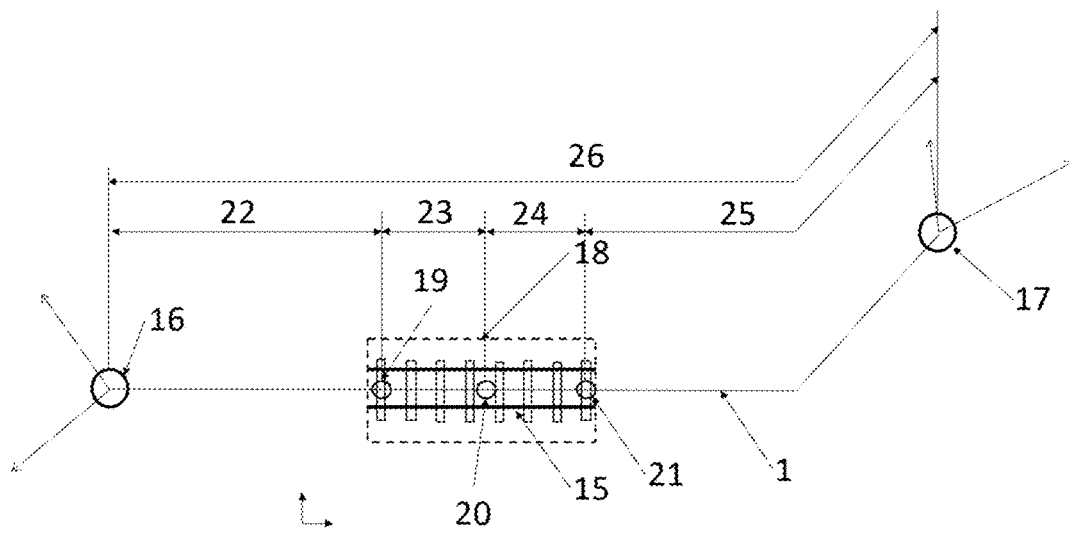
FIG. 7 illustrates the conversion of the locally determined measurement values into a unified coordinate reference system.

Based on FIG. 7, measurement values 19, 20, 21, which measurement values 19, 20, 21 are localized using an individual reference coordinate system, are converted into a unified coordinate reference system.

Likewise, like with the methods described above, measurement values are determined by applying measuring methods of prior art.

For example, the gauge of the track 15 of the railway line 1 in the measurement area 18 between the points 16, 17 can be determined. For example, the gauge can be measured in regular or irregular intervals. Furthermore, for example, a photographic documentation of the track 15 over the measurement area 18 can be created. The reader will recognize without doubt that the following description is not limited to the determination of the gauge and a photographic documentation as measurement values. Gauge and photographic documentation are mentioned merely by way of example and thus not limitation.

The measurement values 19, 20, 21 will be determined by means of a sensor and/or by input. The measurement values 19, 20, 21 comprise measurement value attributes, by means of which measurement value attributes the measured dimensions are represented. Furthermore, the measurement values comprise a measurement location attribute, which measurement location attribute describes the localization of the measurement value by means of an individual coordinate reference system.

The measurement values 19, 20, 21 describe a condition of the railway line, which is set out above by way of example and by no means limitation based on gauge or photographic documentation. The measurement values can also describe the condition of a vehicle traveling on the railway line.

The measurement values form a heterogeneous data volume. At least the localization of the measurement values is heterogeneous.

The coordinate reference systems used for localization of the measurement values can be different.

The measuring methods for determining the measurement values can also be different. Every single measuring method can supply a data set of measurement attributes, which data set conducts, for example, localization of the measurement values or measurement attributes following a different system.

The measurement values are localized using the individual coordinate reference system by reference to a single reference point. This method known in prior art, however, did not allow satisfactory localization of the measurement values in a railway network.

Coordinate transformation from the individual coordinate reference system into a unified coordinate reference system is proposed. The individual coordinate reference system can, for example, be an absolute or relative coordinate reference system, by means of which coordinate reference system the position with respect to a single reference point is indicated. Said coordinate transformation is an initial method step proposed, which method step a person of skill can perform by applying the current teachings of geometry and mathematics.

Furthermore, it is proposed to perform, by applying the current teachings of mathematics and geometry, referencing of the measurement location to a first reference point 19 and/or a second reference point 20 in said coordinate transformation. Preferably and thus not in a limiting way, the said reference points 19, 20 are points 16, 17 of the railway network. The railway line 1 is part of the railway network.

The measurement attributes whose localization is converted into the unified coordinate reference system by referencing to at least one reference point of reference points 19, 20 by applying the current teachings of mathematics or geometry, is stored in a database in a unified structure. The unified measurement value set, which is stored in said unified structure, comprises at least the measurement value attribute and the localization by means of the unified coordinate reference system by referencing to the two reference points 19, 20.

Referencing the measurement values 19, 20, 21 of area 18 can be such that a relative coordinate reference system with a distance equaling zero (0% of the length of the railway line 1) in reference point 19 and with a distance equaling 1 (100% of the length of the railway line 1 between points 16, 17) in reference point 20 is used. Analogously, a relative coordinate reference system with a distance equaling zero and a distance equaling 1 could be introduced at the ends of area 18.

The measurement values 19, 20, 21 are measured, for example, in intervals, from which the distances 22, 23, 24, 25 between a measurement location and both a reference point 16, 17 and the measurement locations as well as the entire distance measured 24 of the measurements are known. From said intervals, the percent distance of the entire distance 24 of each measurement location can be compute, since the length of the railway line 1 between points 16, 17 is known. By way of example and thus nut limitation, the reference point 16 is considered the point with a distance equaling zero. The distances are relatively divided between the measurement locations.

Since the points 16, 17 and the reference points are each regarded as rigidly dictated and thus invariable points of reference, the measurement locations of the measurement values 19, 20, 21 are localized using the computed percent distance and thus considering the reference points 16, 17 as rigid points of reference.

A person of skill will recognize that the localization of the measurement locations does not have to be by distances or intervals. For example, the measurement locations can be localized by means of GPS data, from which the distances 22 to 25 mentioned above can be computed.

Figure 8:
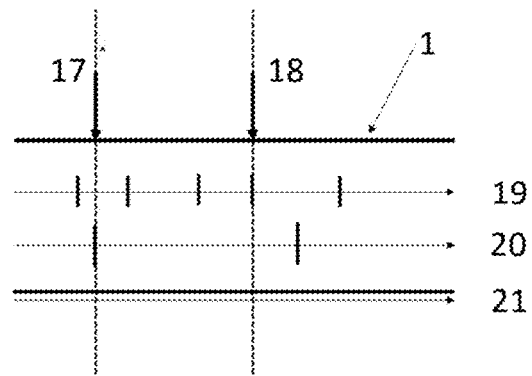
FIG. 8 illustrates a selected technical effect of the inventive method, FIG. 9 explains the inventive method with reference to FIG. 7.

Furthermore, the unified measurement value set can comprise the following railway-specific attributes. The measurement value set can comprise, in addition to localization using the unified coordinate reference system, the indication of a line chainage. Independently of advantageous localization of a measurement value or a device using the unified coordinate reference system, localization via line chainage is common, which is hereby considered. The measurement value set can also comprise indications of the routing, i.e., which points of a railway network a railway line connects, to which railway line or to an area of which railway line measurement values are determined. With reference to FIG. 7, the measurement value set can comprise attributes which describe that the area 18 is part of the railway line 1, which connects points 16, 17. FIG. 8 illustrates a further technical effect of the inventive method. FIG. 8 comprises, by way of example, a railway line 1. Measurement attributes are needed at a first measurement location 17 and at a second measurement location 18, for example, for controlling a track processing device.

A plurality of measurements 19, 20, 21 are present, which measurements 19, 20, 21 are performed at different times. The measurement 19 is characterized by measurement values having been determined in relatively short, irregular intervals. The measurement 20 comprises measurement values with great distances to one another. The measurement 21 is continuous measurement. All in all, the measurement values from measurements 19, 20, 21 represent a heterogeneous data volume.

Transferring the localization of the measurement values from measurements 19, 20, 21 allows comparing and assigning the measurement values. In the example shown in FIG. 8, assignment of selected measurement values is possible, i.e., of those measurement values that have actually been determined at the same measurement location. For example, the measurement value of measurement 19 can be assigned to the measurement value of measurement 21 for the first measurement location 17.

Those measurement values which have actually been measured at a certain measurement location or at a similar measurement location can thus be selected for said measurement location. Selection of a similar measurement location can comprise describing the similarity with, in particular the distance to, said measurement location.

Figure 9:
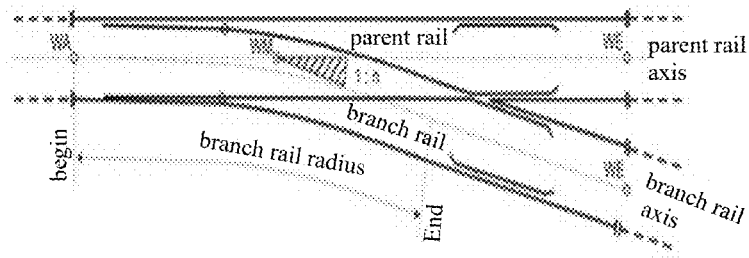
Figure 9:
Figure 9:
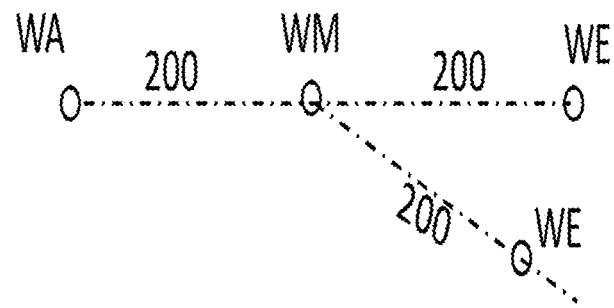

FIG. 9 refers in particular to the figure description of FIG. 7. Measuring a switch by including the measurement values into a railway network is explained.

FIG. 9 comprises, on top, a track map of the switch to be measured. The points WA and WE are reference points, via which the switch to be measured is connected to the railway network. This is explained by the circumstance that the measuring of a switch is under discussion, which is to be rated as exemplary and by no means limiting. A person of skill will be able to select different points of reference in the case of other rail elements. Furthermore, a point WM is included, which point WM is intersection of the switch. The position of point WM is defined by the distance to points WA and WE measurable on the switch.

Measurement values are determined for the partial areas of the switch between the points WA, WM, WE. The number of measurement values is entered in the schematic representation indicated in FIG. 9 below. Localization of the individual measurement values of the partial area is performed taking into consideration the proportional distances between the mentioned points (measurement locations, reference points) and the lengths of the partial areas as invariable dimensions and using at least one of the points WA, WE (WE=beginning of switch, WE=end of switch) as points of reference.

The measurement values can be localized by a first coordinate reference system. The points of reference can be localized by a second coordinate reference system. The second coordinate reference system can correspond to the unified coordinate reference system.

The points WA, WM, WE are entered as fixed or unmovable points when creating the database, which is why the distances between said points WA, WM, WE can be regarded as invariable dimensions when creating the database.

When determining the, e.g., 200 measurement points, the distances between the measuring points and measurement locations, respectively, as well as between measurement location and WA and WM and WE, respectively, are determined. The distances determined when the respective measurement values and measurement locations are determined are proportionally related to the fixed dimensions mentioned above.

For example, in performing coordinate transformation, a measurement location determined halfway between WA and WM is entered into the database as a measurement location halfway between WA and WM. In general, in performing coordinate transformation, a measurement location determined on part of the distance between the points of reference is entered into the database as a measurement location on part of the distance between the points of reference.

The measurement values determined on the switch can be regarded as a first level in the database. The second level of the database relates to the railway network and comprises at least the reference points WA, WE. The two levels can be linked using the reference points and regarding the reference points as fixed and thus invariable points by using a unified coordinate reference system.

By linking the two levels, a comprehensive model comprising the railway network and the switch as an exemplary partial area is created.

Execution of the inventive method can be characterized by the individual measurement distances between the points WA, WM, WE can be regarded as individual levels, which are localized with the second level individually or in total.

The invention claimed is:

1. A method for creating a database for recording a railway line,
creating localized first measurement values using a first measurement location attribute of a first coordinate reference system, the first coordinate reference system being at least one of an absolute first coordinate reference system and a relative first coordinate reference system, the first measurement values comprising first measurement value attributes created by means of at least one of a first sensor and by a first input;
creating localized second measurement values using a second measurement location attribute of a second coordinate reference system, the second coordinate reference system being at least one of an absolute second coordinate reference system and a relative second coordinate reference system, the second measurement values comprising second measurement value attributes created by means of at least one of a second sensor and by a second input, the second coordinate reference system being different than the first coordinate reference system;
performing a coordinate transformation of the first coordinate reference system and the second coordinate reference system into a unified coordinate reference system, the unified coordinate reference system being different from at least one of the first coordinate reference system and from the second coordinate reference system, the unified coordinate reference system comprising at least one reference point, the coordinate transformation being performed by generating a unified measurement value set comprising at least one of the first measurement values and the second measurement values;

storing the unified measurement value set in the database, the first measurement value attributes and the second measurement value attributes being stored in the database in a defined structure in the unified measurement value set, the defined structure of the unified measurement value set comprising at least structured storing of the first measurement value attribute and the second measurement value attribute; and controlling a rail repair machine traveling on the railway line based on the unified measurement value set stored in the database;

wherein the database comprises objects including rail, ballast, vegetation, groundwater, a rail cross-section, catenary, crossties, fasteners for attaching a rail to a crosstie, and catenary masts; and wherein the first measurement values and the second measurement values form a measurement value set, the measurement value set describing one of a first condition of the railway line and a second condition of a vehicle traveling on the railway line, the first measurement values and the second measurement values being heterogeneous.

2. The method of claim 1, wherein:
the first measurement values are obtained via a first measuring method and the second measurement values are obtained via a second measuring method; and
the first measuring method and the second measuring method are different.

3. The method of claim 1, wherein:
the first measurement value comprises a first creation time as a first temporal attribute in a first temporal format; and
the second measurement value comprises a second creation time as a second temporal attribute in a second temporal format;
the temporal format of the creation times is calculated into a unified temporal format; and
storing the unified measurement value sets in the database is done indicating the creation time in the unified temporal format.

4. The method of claim 3, wherein the first creation time and the second creation time are different.

5. The method of claim 1, wherein the unified coordinate reference system comprises at least two reference points.

6. The method of claim 1, wherein:
the first measurement value and the second measurement value are compared to reference measurement values, which reference measurement values are assigned to a reference object; and
in the case of a defined similarity of the measurement values and the reference measurement values, the first measurement value and the second measurement value are assigned to an object, which object is similar to the reference object.

7. The method of claim 1, wherein:
the measurement value set is compared to a reference measurement value set, which reference measurement value set is assigned to a reference object; and
in the case of a defined similarity of the measurement value set and the reference measurement value set, the measurement value set is assigned to an object, which object is similar to the reference object.

8. The method of claim 1, further comprising adding a temporal attribute to the measurement value set, the temporal attribute describing at least one of:
a first creation of at least one of the first measurement value and the second measurement value, and
a second creation of a measuring mark, the measuring mark being one of:
described by the first measurement value and the second measurement value; and
a time the first measurement value and the second measurement value are created.

9. The method of claim 1, wherein a creation time attribute describing a time of creating the measurement value set is added to the measurement value set.

10. The method of claim 1, wherein a mathematical model describing the measurement values is added to the measurement value set.

11. The method of claim 1, wherein the measurement values are read from at least one of a further database and a cache.

12. The method of claim 1, wherein a priority factor is attributed to the measurement value set or each of the measurement values comprised by the measurement value set.

13. The method of claim 1, wherein at least one of:
the first measurement values and the second measurement values are compared against one another;
a first measurement attribute is compared against a further first measurement attribute from the plurality of first measurement value attributes;
a second measurement attribute is compared against a further second measurement attribute from the plurality of first measurement value attributes;
a first measurement attribute is compared against a second measurement attribute;
the measurement values are compared against reference measurement values; and
a measurement value set is compared against a reference measurement value set.

14. The method of claim 1, wherein at least one of:
additional first measurement values are calculated from the first measurement values or additional first measurement value attributes are calculated from the first measurement value attributes; and
additional second measurement values are calculated from the second measurement values or additional second measurement value attributes are calculated from the second measurement value attributes.

15. The method of claim 1, wherein a mathematical model describing at least one of the individual measurement value sets and the multiple measurement value sets is created.

16. The database created by the method of claim 1, the database having user-specific write permissions and read permissions.

17. The database of claim 16, wherein the database is stored on a storage medium or on multiple storage media.

* * * * *